United States Patent [19]
Cesano

[11] Patent Number: 5,846,578
[45] Date of Patent: Dec. 8, 1998

[54] APPARATUS FOR PRODUCING A COMPONENT OBTAINED FROM TWO THERMOPLASTIC SHEETS

[76] Inventor: Franco Cesano, Via Brusiti 13 bis, I-10060 San Secondo Di Pinerolo (Torino), Italy

[21] Appl. No.: 557,183
[22] PCT Filed: Apr. 18, 1994
[86] PCT No.: PCT/IT94/00045
  § 371 Date: Dec. 13, 1995
  § 102(e) Date: Dec. 13, 1995
[87] PCT Pub. No.: WO95/28221
  PCT Pub. Date: Oct. 26, 1995
[51] Int. Cl.⁶ ........................................................ B28B 21/36
[52] U.S. Cl. ........................ 425/503; 425/292; 425/387.1; 425/510; 425/521; 425/806
[58] Field of Search ................................. 425/292, 387.1, 425/503, 510, 521, 806

[56] References Cited

FOREIGN PATENT DOCUMENTS

| | | |
|---|---|---|
| 59-118435 | 7/1984 | Japan . |
| WO 87/06809 | 11/1987 | WIPO . |
| WO8706809 | 11/1987 | WIPO . |
| WO9002645 | 3/1990 | WIPO . |

*Primary Examiner*—David W. Wu
*Attorney, Agent, or Firm*—Sughrue, Mion, Zinn, Macpeak & Seas, PLLC

[57] ABSTRACT

Equipment for producing a component obtained from two sheets of thermoplastic material joined together includes an upper die, a lower die and a passage for delivering a compressed jet of air between the two sheets. The equipment further includes a slide which can move at right angles to the closure direction of the two dies and has a working sheets are urged against a shaping surface formed by the working surfaces of the upper and lower dies and of the slide by the effect of the delivery of compressed air.

8 Claims, 4 Drawing Sheets

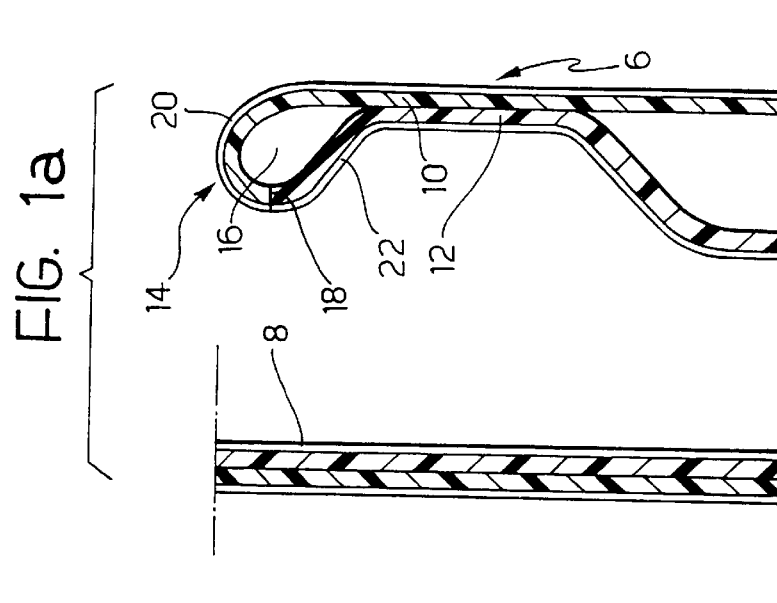
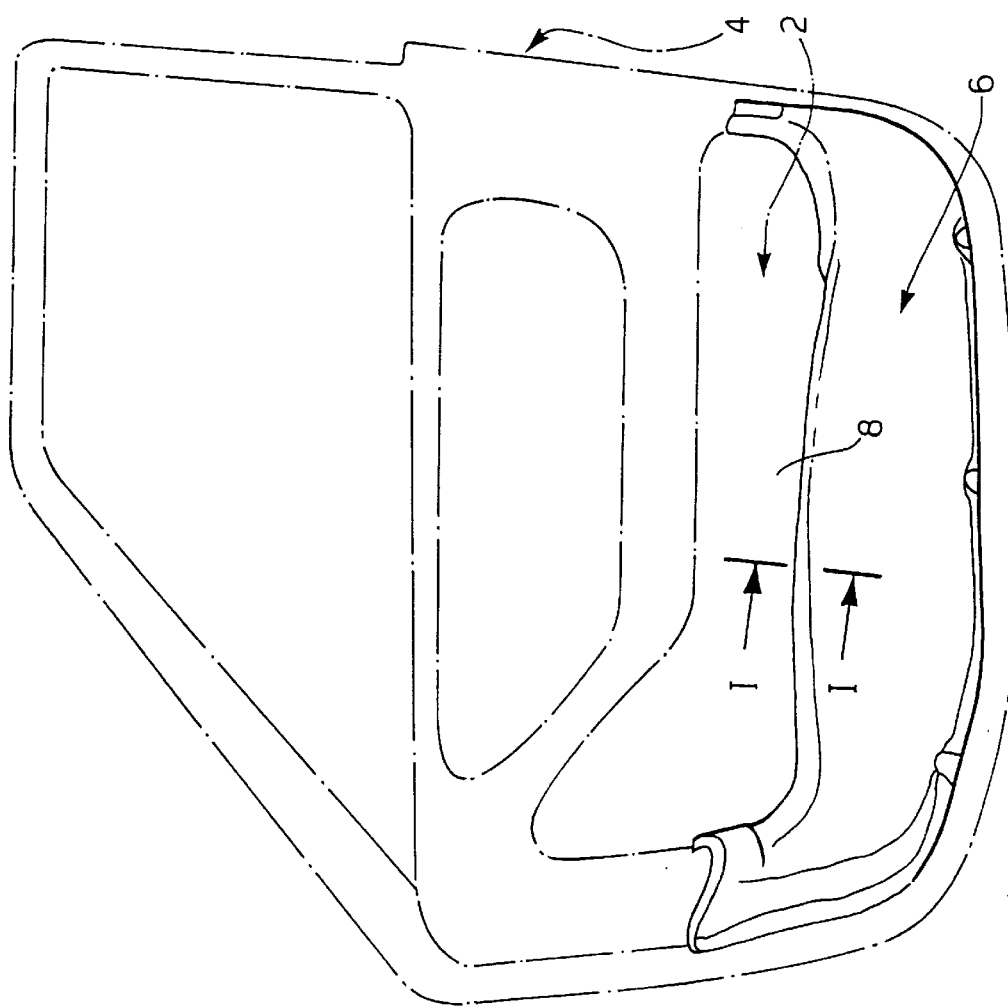

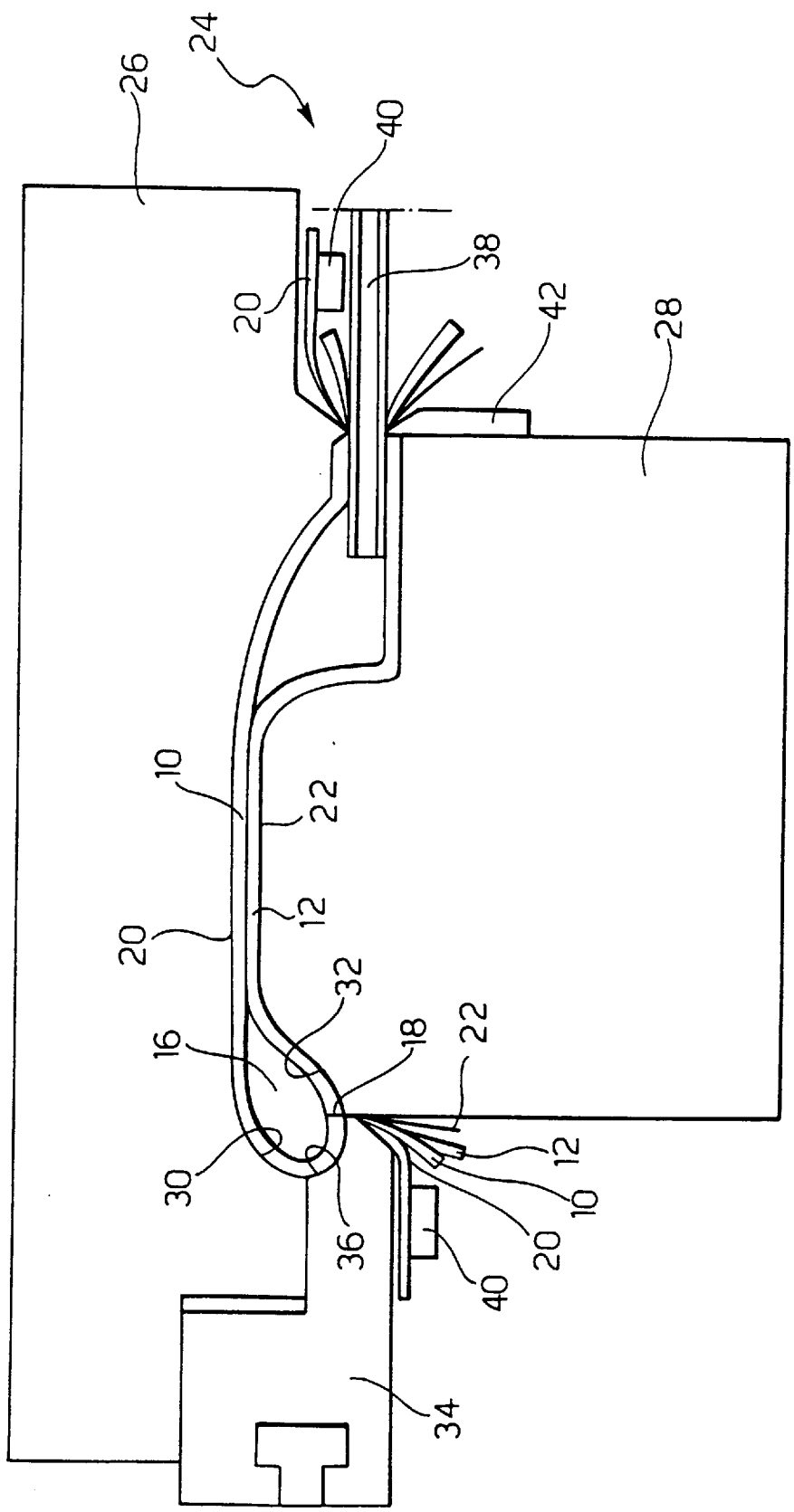

APPARATUS FOR PRODUCING A COMPONENT OBTAINED FROM TWO THERMOPLASTIC SHEETS

BACKGROUND OF THE INVENTION

The present invention relates to equipment for producing a component, particularly for internal fittings of motor-vehicles, obtained by joining two sheets of thermoplastic material together.

The invention has been developed in particular for producing a component intended to form a storage compartment located at the bottom of the cover panel of a motor-vehicle door.

In this case, the fact that the component is produced from two sheets joined together is derived from the need to obtain a high quality part. Along the upper edge of the component constituting the pocket, the two sheets are separated by a cavity so as to obtain a thickened edge which gives the object the appearance of greater solidity and quality. In this case, the problem arises of producing the join between the two sheets in a position which is not visible when the component is mounted.

SUMMARY OF THE INVENTION

Although the invention has been developed in the specific case of a component constituting the storage compartment for a motor-vehicle door, it is not restricted to this specific area and can be applied in all cases in which the problem arises of producing a component formed of two sheets joined together with a thickened edge and in which it is desired to position the connection line in a zone which is not visible when the component is in its position of use.

In order to satisfy the above requirements, the subject of the present invention is equipment having the characteristics forming the subject matter of the main claim.

BRIEF DESCRIPTION OF THE DRAWINGS

Further characteristics and advantages of the present invention will become clear from the following detailed description, given purely by way of non-limiting example, with reference to the appended drawings, in which:

FIG. 1 is a schematic perspective view of a motor-vehicle door, provided with a component obtained by the equipment according to the invention;

FIG. 1a is a schematic section along the line I—I of FIG. 1;

FIGS. 3 and 4 are schematic side views illustrating the equipment of FIG. 2 in two different operating stages.

DETAILED DESCRIPTION OF THE INVENTION

Figure 2:
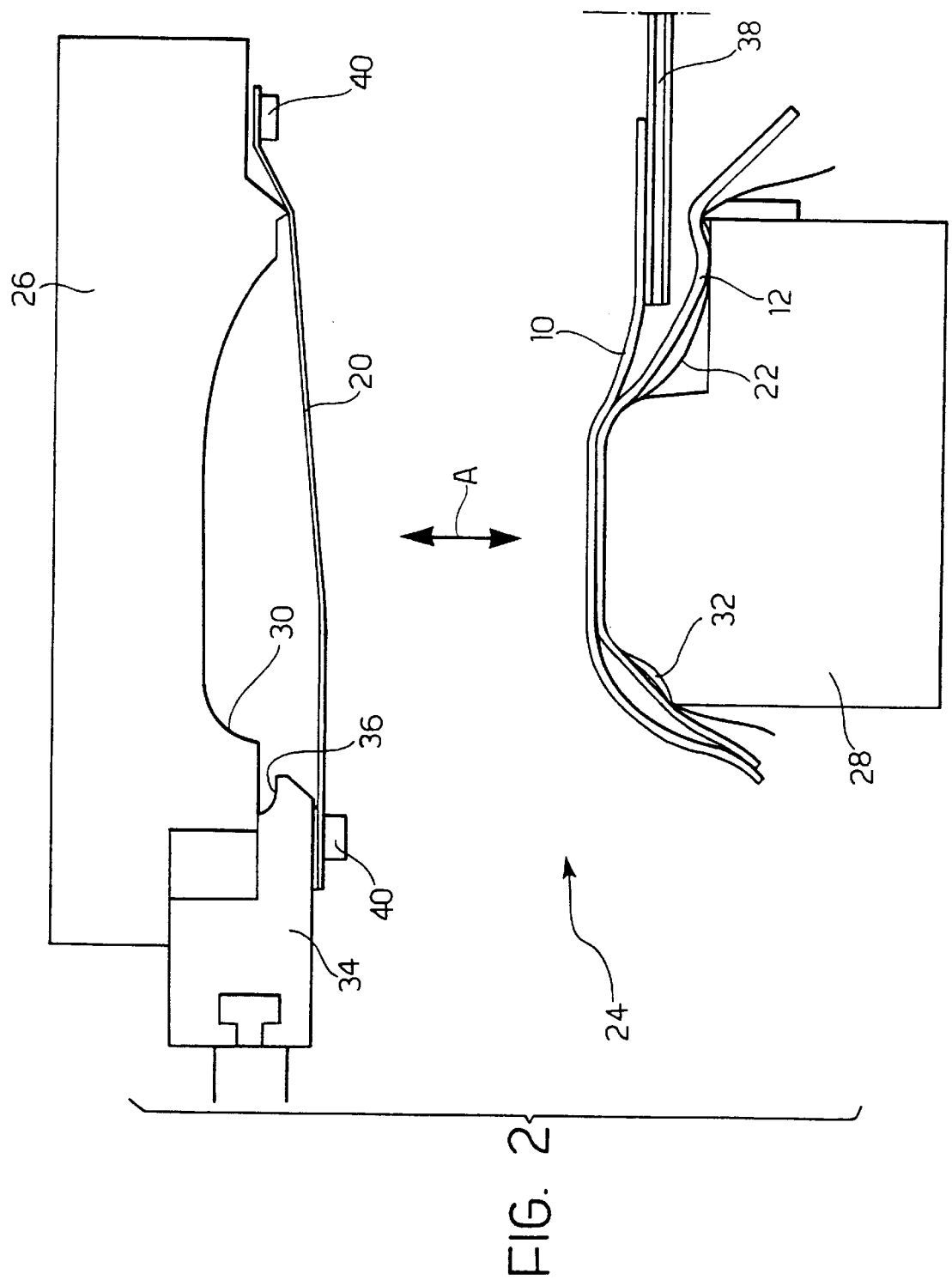
FIG. 2 is a schematic side view of equipment according to the invention.

Referring to FIGS. 1 and 1a, a cover panel applied to the inner part of a vehicle door 4 is indicated 2. The cover panel 2 has a component 6 which is spaced from a wall 8 of the panel so as to form a storage compartment. The component 6 can be separate from or integral with the panel 2.

Referring in particular to FIG. 1a, the component 6 comprises two sheets of thermoplastic material, indicated 10 and 12, which form a thickened edge 14 with a cavity 16. The sheets 10, 12 are joined together in correspondence with the thickened edge 14 along a connection line 18. An aesthetic covering 20 which extends to the connection line 18 is applied to the outer surface of the sheet 10. A second covering 22 may also be applied to the surface of the sheet 12 which faces the interior of the storage compartment.

For aesthetic reasons, the connection line 18 between the sheets 10, 12 and between the coverings 20, 22 should be located in a position which is not visible when the panel is assembled.

Figure 3:
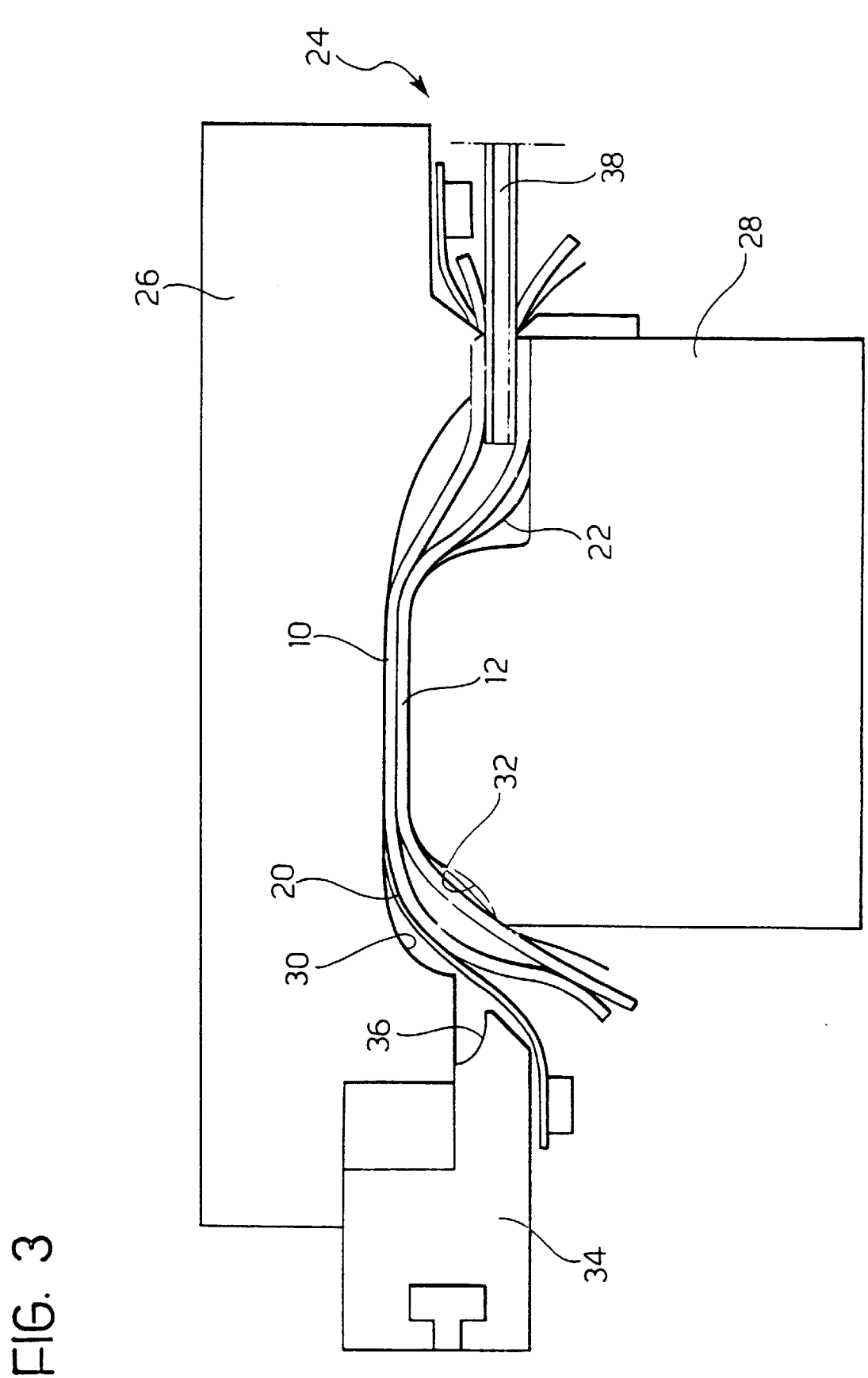

Referring now to FIGS. 2 to 4, equipment for producing the component 6 is indicated 24. The equipment 24 comprises an upper die 26 and a lower die 28 capable of relative movement in the directions indicated by the double arrow A in FIG. 2. In order to shape the edge 14 of the component 6, the dies 26 and 28 have respective working surfaces, indicated 30 and 32.

A slide 34 is able to move in a direction at right angles to the closure direction of the dies 26, 28 and has a working surface 36 which is intended to form a connection between the working surfaces 30 and 32. The movement of the slide 34 is independent of the relative movement between the dies 26, 28 and is controlled by a pressurized-fluid actuator, not shown in the drawings.

Referring to FIG. 2, the covering 22, if used, for the inner surface of the component 6, the inner sheet 12 and the outer sheet 10 are placed in order on the lower die 28. The sheets 10, 12 have previously been heated such that they assume a semiplastic state. Between the sheets 10, 12 is a nozzle 38 for delivering compressed air which, in the preliminary stage shown in FIG. 2, delivers a jet of low intensity sufficient to prevent the two sheets 10, 12 from adhering to one another. The covering 20 for the outer sheet 10 is held taut by a frame 40 carried, for example, by the upper die 26.

In the operating stage shown in FIG. 3, the two dies 26, 28 are brought into their closed configuration and compressed air continues to be delivered at a relatively low intensity through the nozzle 38.

Subsequently, as FIG. 4 shows, the slide 34 is brought into the closed configuration in which the working surface 36 connects the surfaces 30, 32. The edges of the coverings 20 and 22 and of the sheets 10 and 12 extend beyond the moulding zone into the space defined between the slide 34 and the lower die 28. Initially, the slide 34 is urged against the lower die with a relatively low force, sufficient to ensure fluid-tightness between the adjacent edges of the sheets 10, 12 but not high enough to cut the sheets 10, 12. In this state, compressed air is delivered at high pressure through the nozzle 38 such that the sheets 10, 12 are urged against a shaping surface defined by the working surfaces 30, 32 and 36. In this respect, it should be noted that passages (not shown) connecting the cavity 16 to the nozzle 38 are provided between the adjacent central portions by the sheets 10, 12.

At the end of the moulding process brought about by the effect of the strong jet of compressed air, the force at which the slide 34 is pressed against the lower die 28 is increased so as to cut the edges of coverings 20, 22 and of the sheets 10, 12. On the other side of the die, the edges of the sheets 10, 12 and of the coverings 20, 22 are cut by a blade 42 which can move parallel to the closure direction of the dies 26, 28. The dies 26, 28 are then opened and the slide 34 is moved into its retracted position such that the finished component can be extracted.

It will be understood from the above description that the slide 34 with the connecting working surface 36 enables the join 18 to be provided between the sheets 10, 12 in a plane substantially parallel to the closure direction of the two dies 26, 28 and thus in a position which is not visible when the component 6 is in the normal position of use.

I claim:

1. Equipment for producing a component for internal fittings of motor-vehicles, obtained from two sheets of thermoplastic material joined together, the equipment comprising an upper die and a lower die movable relative to each other in a closure direction and means for delivering a jet of compressed air between the two sheets when placed between said upper and lower dies, wherein a slide is movably mounted at right angles to the closure direction of the two dies and has a working surface which connects two working surfaces of the upper die and the lower die to one another, such that, in use, the two sheets are urged against a shaping surface consisting of the working surfaces of the upper and lower dies and of the slide by the effect of the delivery of compressed air, said working surface of said slide having a curvature to define a smooth continuous curved surface with curved surface portion of said dies.

2. Equipment according to claim 1, wherein a join between the two sheets is located in correspondence with a connection line between the working surface of the slide and the working surface of one of the dies.

3. Equipment according to claim 1, further comprising a frame mounted on one of said dies for carrying an aesthetic covering which is applied to the outer surface of one of the sheets at the same time as the sheets are pressed.

4. Equipment according to claim 1, wherein the slide, together with one of the dies, defines a join between the two sheets in a plane substantially parallel to the closure direction of the two dies.

5. Equipment for producing a component for internal fittings of motor-vehicles, obtained from two sheets of thermoplastic material joined together, the equipment comprising an upper die and a lower die movable relative to each other in a closure direction and means for delivering a jet of compressed air between the two sheets when placed between said upper and lower dies, wherein a slide is movably mounted at right angles to the closure direction of the two dies and has a working surface which connects two working surfaces of the upper die and the lower die to one another, such that, in use, the two sheets are urged against a shaping surface consisting of the working surfaces of the upper and lower dies and of the slide by the effect of the delivery of compressed air, wherein the slide and one of said dies have mutually cooperative cutting means to cut the sheets adjacent a join between the sheets.

6. Equipment according to claim 5, wherein a join between the two sheets is located in correspondence with a connection line between the working surface of the slide and the working surface of one of the dies.

7. Equipment according to claim 5, further comprising a frame mounted on one of said dies for carrying an aesthetic covering which is applied to the outer surface of one of the sheets at the same time as the sheets are pressed.

8. Equipment according to claim 5, wherein the slide, together with one of the dies, defines a join between the two sheets in a plane substantially parallel to the closure direction of the two dies.

* * * * *